United States Patent
Esposito et al.

(10) Patent No.: US 8,689,187 B2
(45) Date of Patent: Apr. 1, 2014

(54) PREDICTIVE RUN TESTING

(75) Inventors: Steven G. Esposito, Westford, MA (US); Kiran Chhabra, New Delhi (IN); Saran Prasad, New Delhi (IN); D. Scott Baeder, Auburn, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 1574 days.

(21) Appl. No.: 11/801,037

(22) Filed: May 7, 2007

(65) Prior Publication Data

US 2008/0282124 A1    Nov. 13, 2008

(51) Int. Cl.
G06F 9/44        (2006.01)

(52) U.S. Cl.
USPC .......................................................... 717/124

(58) Field of Classification Search
USPC .......................................................... 717/124
See application file for complete search history.

(56) References Cited

U.S. PATENT DOCUMENTS

| | | | |
|---|---|---|---|
| 5,673,387 A | 9/1997 | Chen et al. | |
| 5,926,622 A | 7/1999 | Hardin et al. | |
| 6,668,340 B1* | 12/2003 | Baker et al. | 714/38 |
| 6,694,509 B1 | 2/2004 | Stoval et al. | |
| 7,747,987 B1* | 6/2010 | Akarte et al. | 717/131 |
| 2005/0216486 A1* | 9/2005 | Barshefsky et al. | 707/100 |

* cited by examiner

*Primary Examiner* — Wei Zhen
*Assistant Examiner* — Lanny Ung
(74) *Attorney, Agent, or Firm* — Alford Law Group, Inc.; Tobi C. Clinton

(57) ABSTRACT

A test object can be selectively included in a test run based on predicting the behavior of the test object. In one embodiment, the present invention includes predicting how likely the test object is to produce a failure in a test run and deciding whether to include the test object in the test run based on the predicted likelihood. This likelihood of producing a failure may be based on any number of circumstances. For example, these circumstances may include the history of prior failures and/or the length of time since the test object was last included in a test run.

29 Claims, 4 Drawing Sheets

PREDICTIVE RUN TESTING

BACKGROUND

Embodiments of the present invention apply to the field of software testing, more specifically to run testing.

Modern software development increasingly relies on automated software testing in an effort to improve software products without using significant developer and quality assurance personnel resources. Software development enterprises are installing entire server farms dedicated to automated product validation. Such product validation systems can perform millions of test per day.

However, there is a limit to the number of tests the product validation system can physically run. Furthermore, increasing the size and performance of the validation system carries additional expense and overhead. One method for reducing the number of tests is to run each test on only one member of a product "family." A product family could be, for example, the different versions of the product designed for related operations systems.

While this method reduces the number of tests, it does not improve the efficiency of the testing, and it lowers the dependability of the tested product. Therefore, it would be desirable to improve the efficiency of a product validation system by having the system run higher-value tests more frequently than lower-value tests, thereby decreasing the number of tests run without compromising the effectiveness of the product validation system.

SUMMARY

In one embodiment of the present invention, test objects are selectively included in a test run that is being created for execution on a software product based on predicting the failure behavior of the test object when included in the test run. In one embodiment, the present invention includes predicting how likely the test object is to produce a failure in a test run and deciding whether to include the test object in the test run based on the predicted likelihood. This likelihood of producing a failure may be based on any number of circumstances. For example, these circumstances may include the history of prior failures and/or the length of time since the test object was last included in a test run.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Product Validation System

Figure 1:
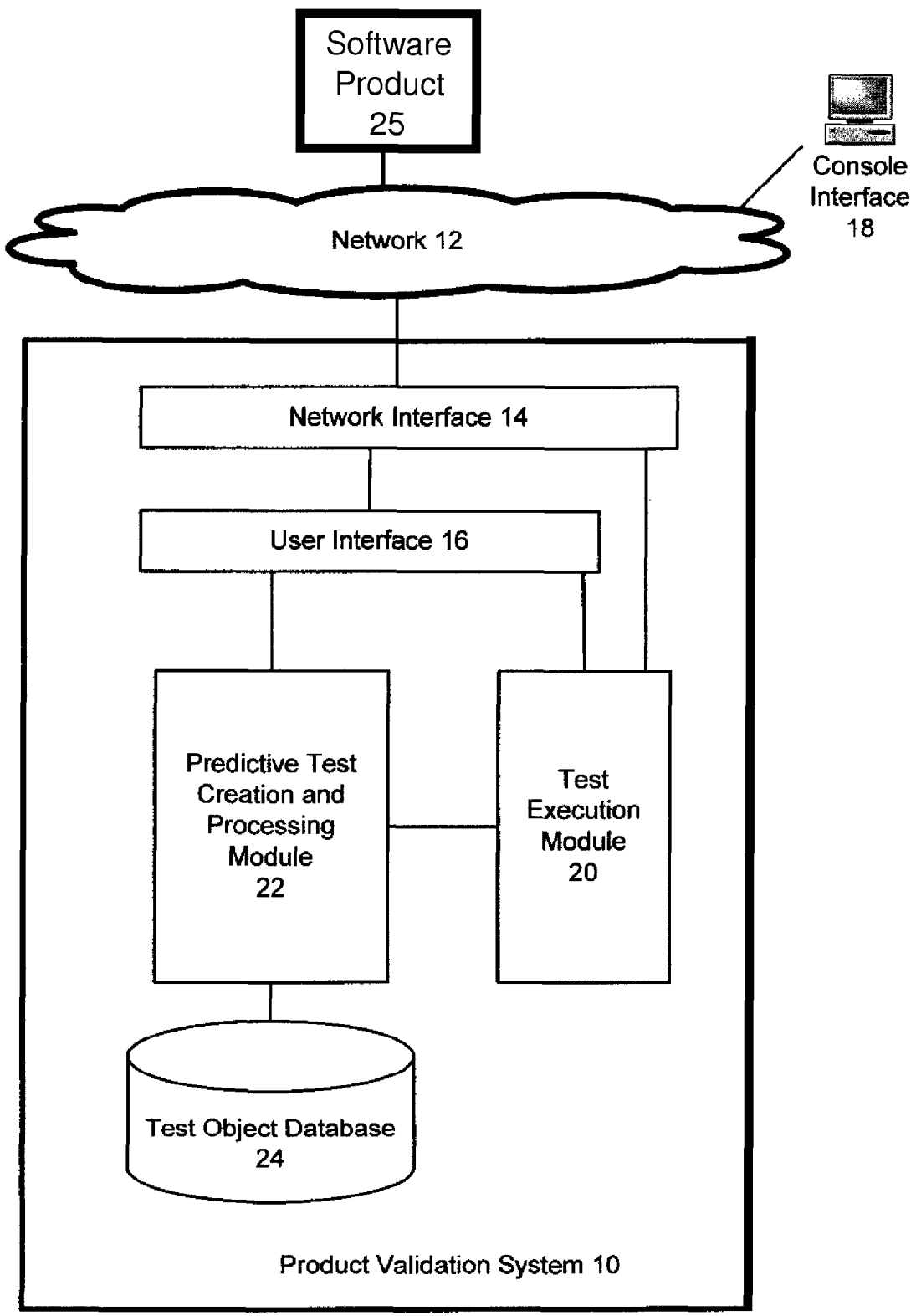
FIG. 1 is a block diagram illustrating a product validation system according to one embodiment of the present invention.

One embodiment of the invention is now described with reference to FIG. 1. FIG. 1 shows a product validation system 10. The product validation system 10 is used to test various software products 25. One type of testing is referred to as a regression run. A test run is a group of tests performed to determine whether changes to existing features or the addition of new features have introduced failures into a previously working software product 25. While much of this description will address test run testing of a single software product 25, embodiments of this invention are equally applicable to other types of testing on multiple software products 25.

In one embodiment, the product validation system 10 includes a network interface 14 to allow the product validation system 10 to be connected to a network 12. The product validation system 10 receives the software product 25 to be tested via the network 12 and can send test results via the network 12 as well. Such results can be accessed via console interface 18, which can be implemented as a browser interface, or other such interface that can access the product validation system 10 through its user interface 16.

The user interface 16 allows a human operator (or operators)—via console interface 18 (or other remote consoles)—to configure the product validation system 10 and to issue command to the product validation system 10. In response to the commands, the test execution module 20 of the product validation system 10 performs a test run, e.g., a test run, on the software product 25—or portion of the software product 25—provided to the product validation system 10 for testing.

The test execution module 20 provides the results of the test run to the user interface 16. In one embodiment, the results of the test run is a list of tests that were submitted along with the status of the run tests. Status categories may include failed (including a crash), user specified ignored, passed, etc. The user interface 16 can create a test run report to deliver to the console interface in a format usable by the human operator to direct action to remedy the test failures.

The product validation system 10 also includes a test object database 24 that stores all the test objects available to the product validation system 10. A "test object" is a generic term to cover a collection of tests organized on any level. A test object can be a single test, a test case on a single port, a test group, a test bank, or any other association of tests that succeed or fail as one entity. When a test object is executed (or "run") as part of a test run it either passes or fails. An example test objects could be a singular test focused on a singular function point, such as a language construct in Verilog, or focused on an environment such as a particular operating system like Solaris or Linux.

When a test object passes, the results are stored and processed to reduce priority/importance and for resampling when applicable. However, when a test object fails, useful information about what needs to be done to the software product 25 is being produced. Thus, if not all the tests objects can be run in every test run, it is efficient to run only the test objects that are likely to fail.

Predictive Test Run Creation

Figure 2:
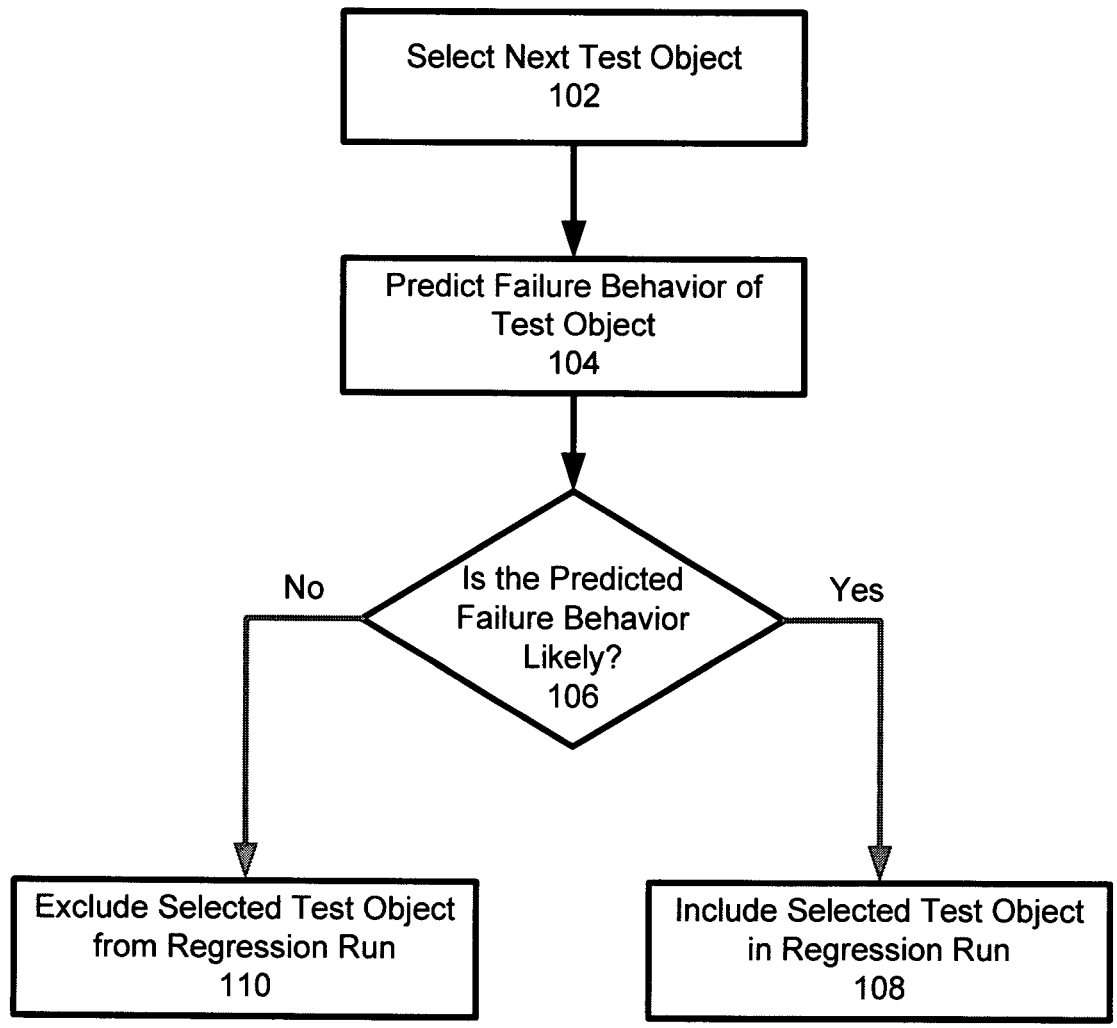
FIG. 2 is a flow diagram illustrating predictive test run creation according to one embodiment of the present invention.

In one embodiment, the product validation system 10 includes a predictive test creation and processing module 22 to create test runs including only tests with a requisite likelihood to produce a failure. One embodiment for the operation of the predictive test creation and processing module 22 is now described with reference to FIG. 2. In block 102, the predictive test creation and processing module 22 selects the next test object for consideration from the test object database 24.

In block 104, the predictive test creation and processing module 22 predicts the failure behavior of the test object under consideration. The failure behavior of a test object characterizes the likelihood that the test object will produce a failure if included in the test run being assembled for execution.

In block 106 a determination is made as to whether the predicted failure behavior of the test object is likely, in other words, if the test object is sufficiently likely to produce a failure. If in block 106 the predicted failure behavior is found likely, then in block 108 the selected test object is added to the test run being assembled. If, on the other hand, in block 106 the predicted failure behavior is found not to be likely, then in block 110 the selected test object is excluded from the test run. Processing then continues at block 102 with the selection of the next test object in the test object database 24 until all test objects in the test object database have been considered.

Figure 3:
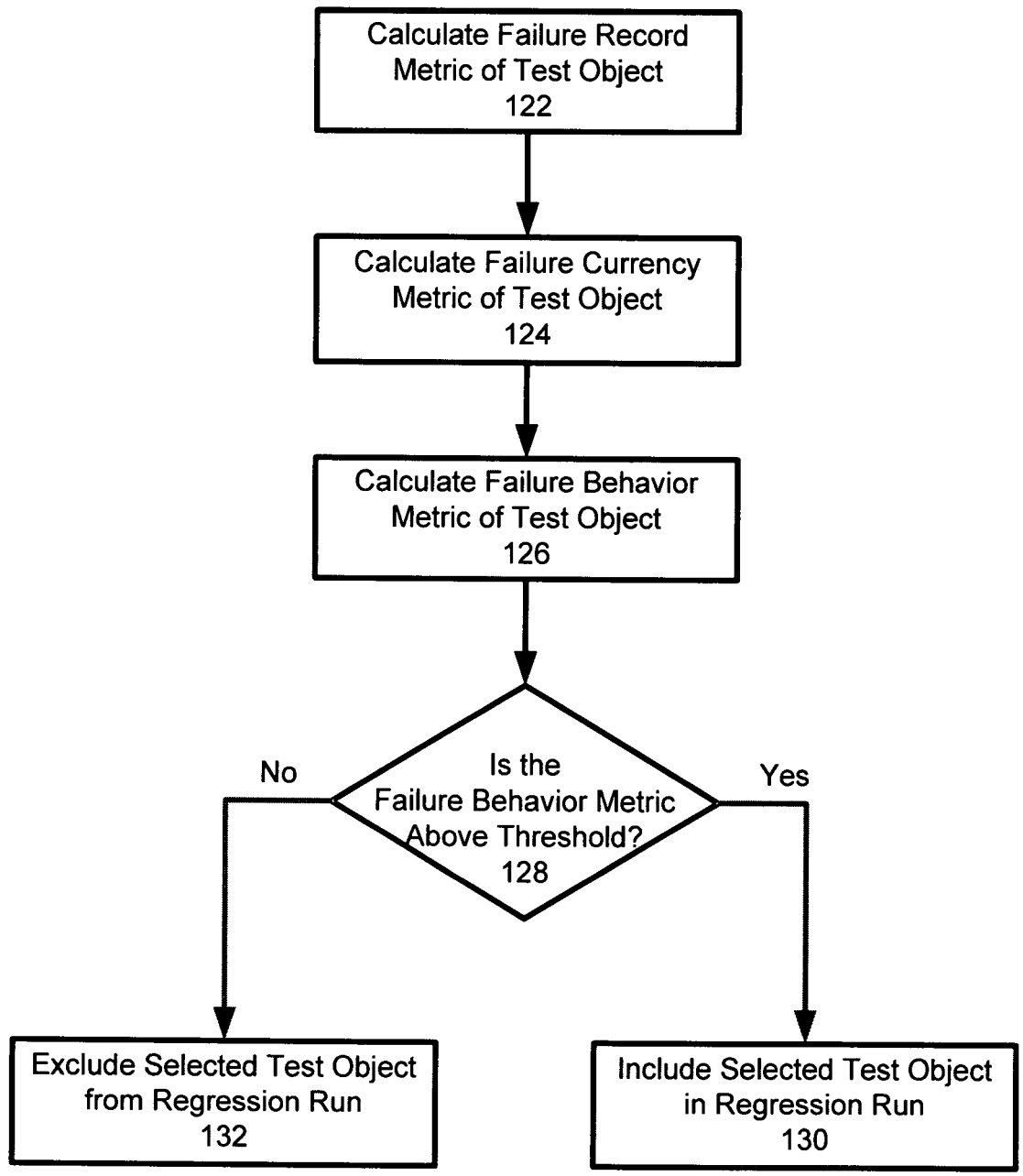
FIG. 3 is a flow diagram illustrating predictive test run creation according to another embodiment of the present invention.

One embodiment of implementing the prediction and evaluation of the predicted failure behavior of the selected test object is now described in more detail with reference to FIG. 3. In block 122, the predictive test creation and processing module 22 calculates a failure record metric of the test object. The failure record metric is a value that reflects with what frequency a test object fails.

In one embodiment, the failure record metric is calculated by dividing the total number of failures (the failure number) produced by a test object by the number of times the test object has been executed. If a test object contains multiple tests, the number of failures or other failure statistics can be averaged to determine the failure record metric of the test object.

In one embodiment, the record for the test object in the test object database 24 includes an associated failure number and run number. The failure number is incremented every time the test object produces a failure, while the run number is incremented every time the test object is executed, regardless of the result produced. Thus, the failure record metric can be calculated from these statistics associated with each test object by the test object database 24. Other similar metrics and statistical figures may also be used to reflect the failure record of test objects.

In block 124, a failure currency metric of the test object is calculated by the predictive test creation and processing module 22. In software testing, a recent failure is more relevant than a more distant failure, since the code may have changed since the distant failure. Thus, when evaluating the failure behavior of a test object, priority is given to test objects that have failed more recently. How recently a test failed is reflected in the failure currency metric.

In one embodiment, the failure currency metric is a temporal metric that compares the current time kept by the product validation system 10 with a timestamp showing the last failure of the test object. Such a timestamp can be associated with each test object by the test object database 24 and can be updated by the predictive test creation and processing module 22 after each test object failure. In one embodiment, tests objects are not executed in every test run (e.g., for a user specified ignored status). For example, if ignored status occurs, the time may not be increased for the ignored test object for that specific run.

In another embodiment, the failure currency metric is a "failure distance" of the test object. A failure distance is the number of times the test object has been executed without failure. In other words, the failure distance is the number of test runs including the test object since the last failure of the test object. For example, in one embodiment, if the test object failed on the previous occasion when it was executed, its failure distance can be defined as zero (0). Then, if the test object is executed without producing a failure the next three times it is included in a test run, the failure distance of the test object would be three (3).

In another embodiment, the failure distance can be initialized at one (1), meaning a failure distance of one (1) would mean that the test object failed in the previous test run in which the test object was included. Then, if the test object is executed without producing a failure the next three times it is included in a test run, the failure distance of the test object would be four (4). Other such value definition schemes may be created for the failure currency metric. When a test object includes multiple tests, the failure distance for the test object can be defined conservatively as the minimum of all the test failure distances, or as the average of such failure distances, or in some other combined manner.

The failure distance can also be associated with each test object by the test object database 24. In block 126, the predictive test creation and processing module 22 calculates the failure behavior metric of the test object. The failure behavior metric represents the predicted likelihood that the selected test object will produce a failure if it is included in the test run being assembled for execution. The failure behavior metric combines the information included in both the failure record metric determined in block 122 and the failure currency metric determined in 124.

In one embodiment, the failure behavior metric is calculated by dividing the failure record metric by the failure currency metric. Since the failure record metric is larger the more relevant a test object is, and the failure currency metric is smaller the more relevant a test object is (i.e., the more likely it is to produce a failure), dividing the two quantities results in a relatively larger failure behavior metric if the test object is more relevant, and a relatively smaller failure behavior metric if the test object is less relevant. Other definitions and metrics can produce different scales.

If a tests object failure on the previous occasion is defined to be a failure distance of zero (0) for the test object, then dividing by such a failure currency metric would produce an error. To address such a situation, in one embodiment, if the failure distance of a test object is zero (0)—the test object failed on the previous execution—then the test object is automatically included in the current test run.

In block 128, a determination is made by the predictive test creation and processing module 22 as the whether the failure behavior metric is above a threshold value. If, in block 128 it is determined that the failure behavior metric is above the threshold value, then in block 130 the selected test object is included in the current test run being created. If, on the other hand, in block 128 it is determined that the failure behavior metric is not above the threshold value, then in block 132 the selected test object is excluded from the current test run being created.

In one embodiment, the threshold value is user-configurable. The threshold value can be maintained by the predictive test creation and processing module 22 and exposed to a human operator via the user interface 16. The user interface 16 may expose the actual numerical value, or some English (or other) language classification such as Moderate Test Exclusion, Aggressive Test Exclusion, and so on. Alternatively the user can be provided some graphical tool, such as a thermostat, to control the threshold value for the failure behavior metric of test objects.

In another embodiment of the present invention, several thresholds can be used. For example if the failure behavior metric of a test object is below a first lower threshold, then the test object is excluded from the test or is scheduled to be executed on an infrequent rotating basis. However, if the failure behavior metric of a test object is above the first lower threshold but still below a second higher threshold, then the test object is scheduled to be executed on a more frequent rotating basis.

For example, if test objects with failure behavior metrics below the lower threshold are scheduled to be included in every $30^{th}$ test run, then test objects with failure behavior metrics between the lower threshold and the higher threshold could be scheduled to be included in every $10^{th}$ test run. Furthermore, test objects with failure behavior metrics above the higher threshold could be scheduled to be included in every test run, or some other number less than 10 for so long as their failure behavior metrics remain above the higher threshold.

The above two-threshold description is only an example. Similar schemes can be implemented with any number of thresholds. Furthermore, the specific numbers of iterations between test inclusions are provided merely for illustration, and any other numbers can be used.

Scheduling the execution of a test object for every some number of test runs—that is, including the test object in every $x^{th}$ test run—can be implemented by associating such a number with the test object in the test object database. Another counter can be initialized and incremented with every missed test run. When the counter reaches the $x^{th}$ test, the test object is added to the test run and the counter is re-initialized. This number can be updated as the failure behavior metric of the test object changes and rises above or falls below the certain thresholds described above.

The predictive test creation and processing module 22 can use various other means of determining whether to include or exclude test object from a particular test run. For example, if a test object is excluded from every test run scheduled for a product family based on its failure behavior, the predictive test creation and processing module 22 can override the exclusion to make sure each test object is executed during the testing of at least one member of the product family. In another example, the user can set a test object to always be executed or manually mark it to be executed in the next test run.

Furthermore, to ensure that the failure behavior metric accounts for changes in the software, test suite, environment and the like, if a test object is excluded from a threshold number of test runs, the predictive test creation and processing module 22 "re-samples" by including the test object in the next test run regardless of the failure behavior metric associated with the test object. Such re-sampling can be implemented using the counter explained further above. Thus, periodic re-sampling along with other techniques may be used to attempt to capture undiscovered failures.

For simplicity, in the description above, each test object is described as having only one associated failure behavior metric, along with other metrics used to calculate the failure behavior metric. However, in a real-world product validation system, the test object may have several failure behavior metrics, each of which can be tied to a particular section of code.

Example Computer System

Figure 4:
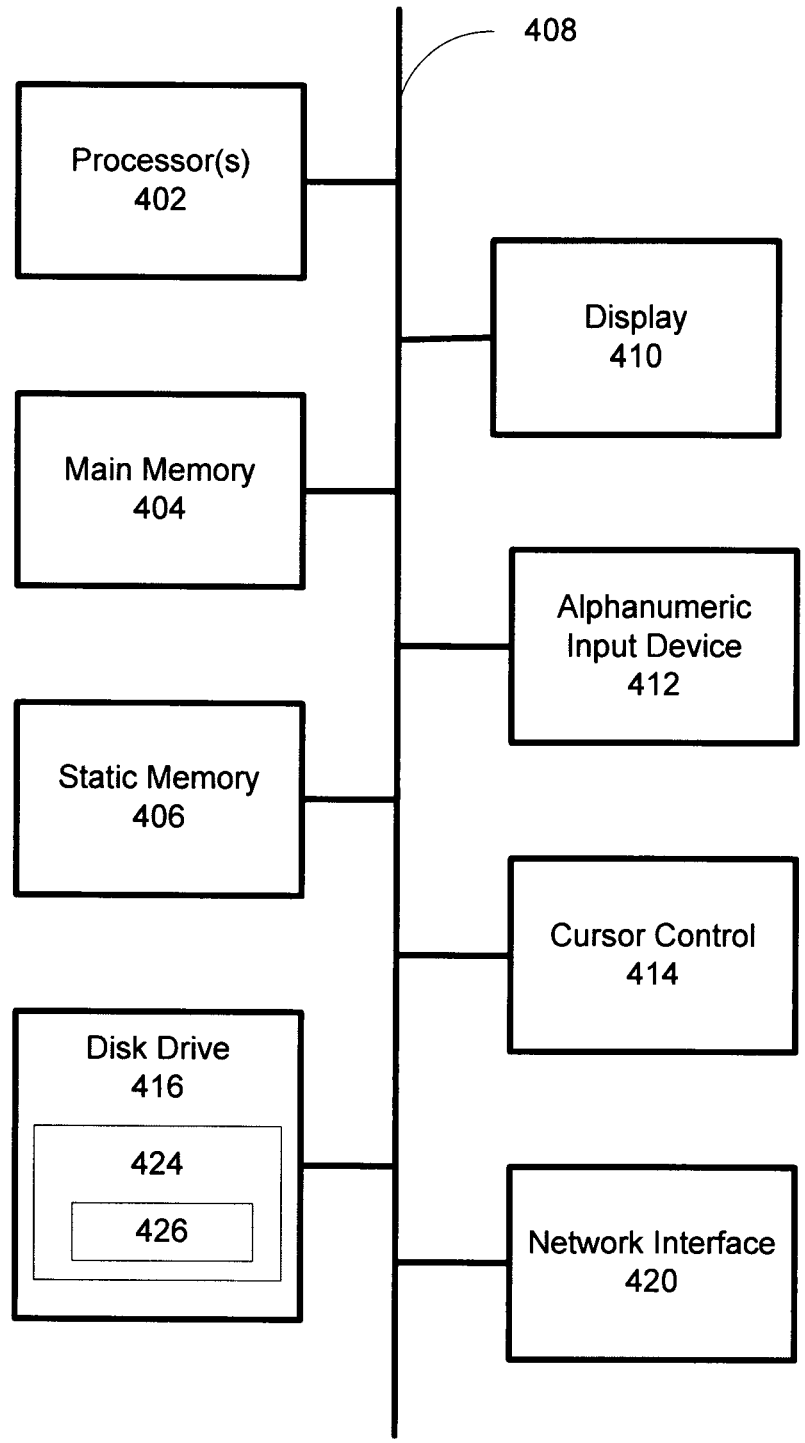
FIG. 4 is a block diagram illustrating an example computer system according to one embodiment of the present invention.

Various embodiments of the present invention have been described in the context of a server that performs product validation functionalities and a browser/console interface operable to access and view those functionalities. An example computer system on which such server and/or console interface can be implemented in now described with reference to FIG. 4. Numerous features described with reference to FIG. 4 can be omitted, e.g., a server will generally not include video display unit 410. Computer system 400 may be used to perform one or more of the operations described herein. In alternative embodiments, the computer system environment may comprise a network router, a network switch, a network bridge, Personal Digital Assistant (PDA), a cellular telephone, a web appliance or any other machine capable of executing a sequence of instructions that specify actions to be taken by that machine.

The computer system 400 includes a processor 402, a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alpha-numeric input device 412 (e.g., a keyboard), a cursor control device 414 (e.g., a mouse), a disk drive unit 416, and a network interface device 420.

The disk drive unit 416 includes a machine-readable medium 424 on which is stored a set of instructions (i.e., software) 426 embodying any one, or all, of the methodologies described above. The software 426 is also shown to reside, completely or at least partially, within the main memory 404 and/or within the processor 402. The software 426 may further be transmitted or received via the network interface device 422. For the purposes of this specification, the term "machine-readable medium" shall be taken to include any medium that is capable of storing or encoding a sequence of instructions for execution by the computer and that cause the computer to perform any one of the methodologies of the present invention. The term "machine-readable medium" shall accordingly be taken to include, but not be limited to, solid-state memories, optical and magnetic disks, and carrier wave signals.

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for predicting a test run for a software product, comprising:
   calculating a failure currency metric of a test object associated with one or more software products, wherein the failure currency includes a temporal metric generated by a product validation system, and wherein the temporal metric is associated with a time the test object failed execution on the one or more software products;
   predicting a failure behavior of a test object based on the failure currency metric, the predicted failure behavior being an indication of how likely the test object is to produce a failure when executed on the software product, wherein the product validation system does not include the software product; and
   determining whether the test object is to be included in a test run for execution on the software product, the determining using the predicted failure behavior of the test object.

2. The method of claim 1, further comprising
   calculating a failure record metric of the test object, wherein the failure behavior of the test object is further based on the failure record metric.

3. The method of claim 2, wherein
   the failure record metric of the test object is determined by dividing a number of failures produced by the test object by a total number of past test runs on the one or more software products that included the test object.

4. The method of claim 1, wherein calculating the failure currency metric comprises
   generating the temporal metric by comparing a current time of the product validation system with a timestamp that shows a last failure time of the test object.

5. The method of claim 1, wherein
   the failure currency metric further includes a failure distance of the test object.

6. The method of claim 5, wherein
   the failure distance of the test object comprises
      a value indicating a number of times the test object executed without a failure on the one or more software products.

7. The method of claim 1, further comprising
   calculating a failure behavior metric of the test object, wherein the failure behavior of the test object is further based on the failure behavior metric.

8. The method of claim 7, wherein
   predicting the failure behavior of the test object comprises
      determining a failure record metric of the test object on a plurality of previous software products; and
      dividing the failure record metric of the test object by the failure currency metric of the test object.

9. The method of claim 8, wherein
   determining whether the test object is to be included in a test run for execution on the software product comprises
      comparing the failure behavior metric against a first threshold.

10. The method of claim 9, wherein
    the first threshold is user-configurable.

11. The method of claim 9, wherein
    determining whether the test object is to be included in a test run for execution on the software product further comprises
       comparing calculated failure behavior metric against both the first threshold and a second threshold differing from the first threshold.

12. The method of claim 1, wherein
    one or more portions of the software product have yet to be tested with a test run including the test object.

13. The method of claim 12, wherein
    the software product is a new software product with the new software product being associated with a product family of software products or having new features over a previously working software product.

14. The method of claim 12, wherein
    the software product is a revised software product derived from a previously working software product having changes to features therein.

15. A product validation system for predicting a test run for a software product, comprising:
    a processor to execute one or more instructions to provide
       a test object database on the product validation system to store at least one test object associated with one or more software products;
       a test execution module to execute test objects stored in the test object database; and
       a predictive test creation and processing module in communication with the test object database and the test execution module, the predictive test creation and processing module being configured to
          calculate a failure currency metric of a test object associated with one or more software products, wherein the failure currency includes a temporal metric generated by the product validation system, and wherein the temporal metric is associated with a time the test object failed execution on the one or more software products,
          predict a failure behavior of the test object based on the failure currency metric, the predicted failure behavior being an indication of how likely the test object is to produce a failure when executed on the software product, wherein the product validation system does not include the software product, and
          determine whether the test object is to be included in a test run for execution by the test execution module on the software product, the determining using the predicted failure behavior of the test object.

16. The product validation system of claim 15, wherein
    the predictive test creation and processing module is further configured to calculate a failure record metric of the test object, wherein the failure behavior of the test object is further based on the failure record metric.

17. The product validation system of claim 16, wherein
    the failure record metric of the test object is determined by the predictive test creation and processing module being further configured to divide a number of failures produced by the test object by a total number of past test runs on the one or more software products that included the test object.

18. The product validation system of claim 15, wherein
    the predictive test creation and processing module is further configured to generate the temporal metric by comparing a current time of the product validation system with a timestamp that shows a last failure time of the test object.

19. The product validation system of claim 15 wherein the failure currency metric further includes a failure distance of the test object.

20. The product validation system of claim 19, wherein the failure distance of the test object comprises a value indicating a number of times the test object executed without a failure on the one or more software products.

21. The product validation system of claim 15, wherein one or more portions of the software product have yet to be tested with a test run including the at least one test object.

22. The product validation system of claim 21, wherein the software product is a new software product with the new software product being associated with a product family of software products or having new features over a previously working software product.

23. The product validation system of claim 21, wherein the software product is a revised software product derived from a previously working software product having changes to features therein.

24. A non-transitory machine-readable storage medium having stored thereon data representing instructions that, when executed by a processor, cause the processor to perform operations comprising:

calculating a failure currency metric of a test object associated with one or more software products, wherein the failure currency includes a temporal metric generated by a product validation system, and wherein the temporal metric is associated with a time the test object failed execution on the one or more software products;

predicting a failure behavior of a test object based on the failure currency metric, the predicted failure behavior being an indication of how likely the test object is to produce a failure when executed on a software product, wherein the product validation system does not include the software product; and determining whether the test object is to be included in a test run for execution on the software product, the determining using the predicted failure behavior of the test object.

25. The non-transitory machine-readable storage medium of claim 24, the operations further comprising calculating a failure behavior metric of the test object, wherein the failure behavior of the test object is further based on the failure behavior metric.

26. The non-transitory machine-readable storage medium of claim 25, wherein predicting the failure behavior of the test object comprises determining a failure record metric of the test object on a plurality of previous software products; and dividing the failure record metric of the test object by the failure currency metric of the test object.

27. The non-transitory machine-readable storage medium of claim 24, wherein one or more portions of the software product have yet to be tested with a test run including the test object.

28. The non-transitory machine-readable storage medium of claim 27, wherein the software product is a new software product with the new software product being associated with a product family of software products or having new features over a previously working software product.

29. The non-transitory machine-readable storage medium of claim 27, wherein the software product is a revised software product derived from a previously working software product having changes to features therein.

* * * * *